United States Patent
Asaba

(10) Patent No.: US 6,940,206 B2
(45) Date of Patent: Sep. 6, 2005

(54) CORELESS MOTOR

(75) Inventor: Keisuke Asaba, Tokyo (JP)

(73) Assignee: Kabushiki Kaisha Asaba, Tokyo (JP)

( * ) Notice: Subject to any disclaimer, the term of this patent is extended or adjusted under 35 U.S.C. 154(b) by 0 days.

(21) Appl. No.: 10/735,820

(22) Filed: Dec. 16, 2003

(65) Prior Publication Data

US 2004/0164638 A1 Aug. 26, 2004

(30) Foreign Application Priority Data

Dec. 17, 2002 (JP) ......................................... 2002-365327

(51) Int. Cl.⁷ ........................... H02K 3/47; H02K 23/58
(52) U.S. Cl. .................. 310/266; 310/154.05; 310/198; 310/261
(58) Field of Search .................. 310/154, 195, 310/198, 199, 208, 261, 266

(56) References Cited

U.S. PATENT DOCUMENTS

| | | | | |
|---|---|---|---|---|
| 4,553,058 A | * | 11/1985 | Iwasaki | 310/268 |
| 4,604,540 A | * | 8/1986 | Fukami | 310/154.06 |
| 4,639,624 A | * | 1/1987 | Ejiri et al. | 310/154.06 |
| 4,712,034 A | * | 12/1987 | Iwasaki | 310/217 |
| 5,298,825 A | * | 3/1994 | Oudet et al. | 310/156.45 |
| 5,793,133 A | * | 8/1998 | Shiraki et al. | 310/81 |

FOREIGN PATENT DOCUMENTS

| | | | | |
|---|---|---|---|---|
| EP | 1176694 A1 | * | 1/2002 | H02K/3/04 |
| JP | 54057105 A | * | 5/1979 | H02K/23/58 |
| JP | 55079670 A | * | 6/1980 | H02K/23/58 |
| JP | 59041164 A | * | 3/1984 | H02K/23/58 |

* cited by examiner

*Primary Examiner*—Burton Mullins
(74) *Attorney, Agent, or Firm*—Israel Gopstein

(57) ABSTRACT

To realize a small-sized coreless motor featuring excellence in responsiveness and controllability, capability of obtaining greater rotating torque compared with driving power supplied to the coil, great intensity, ease in assembly and high energy efficiency, a coreless motor of the present invention comprising; each of coils 8, 8 comprises a flat portion, which consists of a winding unit that confronts the upper and lower faces of a ring-shaped magnet 5 and whose plane part forms an arc shape, and a curved-and-folded portion, which consists of a winding unit that confronts the external circumstance side face of the magnet, with the section from one end of the lead wire constituting these winding units to the other end being arranged to compose a continuous, hollow unit; wherein the flat portion in the lower part of these coils 8, 8 is fitted to thin-sheet-shaped flange 9a below coil holder 9, which is installed around the rotating axis 4, so that multiple coils are arranged along the external circumference direction of the magnet, and to the flat portions on the upper side of the coils 8, 8, thin/round annulus upper-side reinforcing plates 15 are attached.

16 Claims, 5 Drawing Sheets

F I G. 7
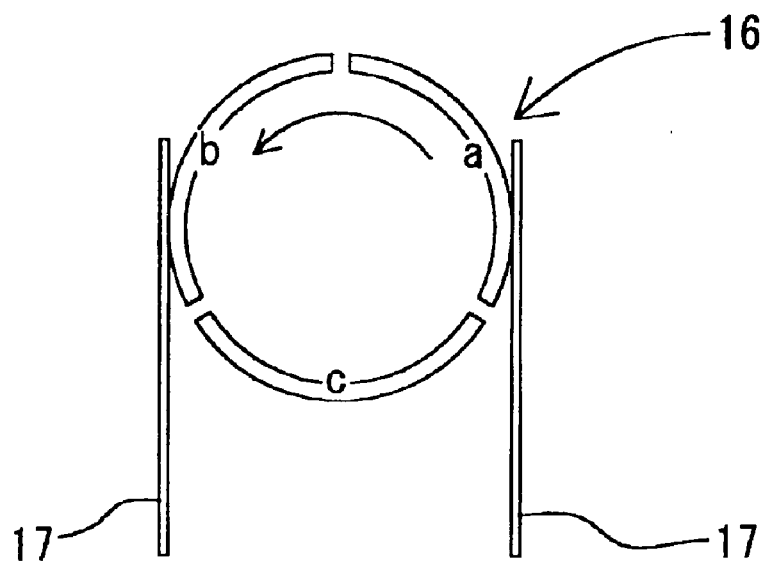
F I G. 8
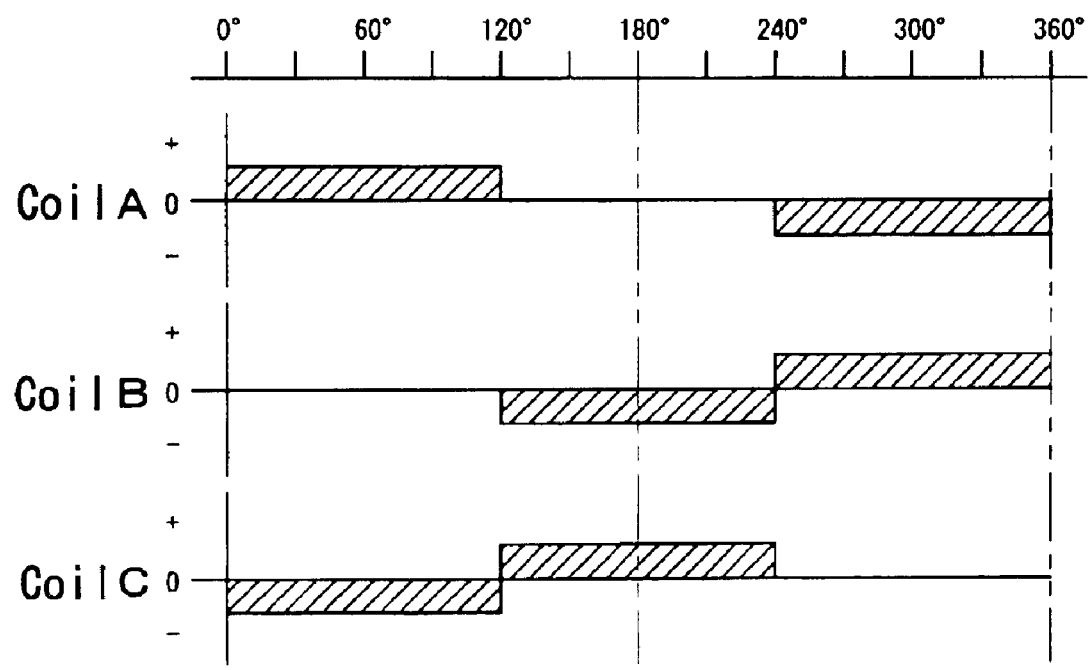

CORELESS MOTOR

BACKGROUND OF THE INVENTION

1. Technical Field

This invention relates to a coreless motor suitable for use as a driving force of precision equipment.

2. Description of the Prior Art

A small-sided motor used as an actuator for precision equipment has conventionally contained a coreless motor in which a coil circulates around a magnet. Its merits are that it is free from reluctance torque that occurs in a cored motor (motor with an iron core), that commutation sparks are few and electric noise is little and that the rotor inertia is small and responsiveness is resultantly excellent, among other characteristics.

It is a matter of course that a motor to be used as a driving force for precision equipment must be excellent in responsiveness and controllability. In the case of precision equipment having many motors, furthermore, each motor is required to consume little electric power and to have high energy efficiency.

Although the conventional coreless type motor is excellent in responsiveness and controllability, it also has a shortcoming of not necessarily being characterized by high energy efficiency for the reasons shown below.

The conventionally used coreless motor is of the type in which a cylindrical-form coil is revolved in a gap between a magnet and a coil yoke, but rotating torque working on the said coil arises in the direction that constitutes a right angle with the lead wire composing the coil; as such, if the direction of the lead wire composing the coil (direction of wiring) is arranged to be in a right direction with the coil revolution circumference direction, the rate of rotating torque (rotational output) in relation to the strength of a magnetic field formed by the coil will rise, so that a motor featuring high energy efficiency can be obtained.

However, a cylindrical-form is so composed that the lead wire constituting the coil is not wound to be in parallel with the elevated height of the coil but designed to have some degree of inclination angle, such that the inclination angle becomes larger, the rotating torque working on the magnet reduces, lowering energy efficiency.

If the axis direction length is tried to be shortened in such a motor, therefore, the angle formed by the coil winding direction with the coil axis direction will become larger, and energy efficiency will accordingly decline further, which poses a barrier in realizing small-sized high-efficiency motor.

OBJECT OF THE PRESENT INVENTION

The object of this invention is to realize a small-sized coreless motor excellent in responsiveness and controllability, capable of obtaining greater rotating torque in comparison with driving electric power to the coil and featuring great intensity, ease in assembly and high efficiency.

SUMMARY OF THE INVENTION

To attain the said object, a coreless motor relating to the invention is to be the one equipped with a ring-shaped coil yoke fitted to the interior of a casing, which has a conductive coil connected to a ring-shaped magnet, whose external circumference face opposes the internal circumference face of the coil yoke, with the coil designed to revolve jointly with the rotating axis following power input to the said coil; wherein the said coil confronts the upper and lower faces of the magnet and consists of a flat portion whose plane part takes an arc form and of a curved-and-folded portion composed of a winding unit confronting the external circumference side face of the magnet, while the section from one end of the lead wire composing these winding units to its other end constitutes a continuous hollow unit; wherein a thin-sheet flange is installed on the lower part of the coil holder fixed to the periphery of the said rotating axis and a plurality of said coils are attached so as to be arranged in line with the circumference direction of the magnet by fixing the flat portion on the lower side of each coli to the flange; and wherein thin, round, annulus-shaped upper-side reinforcing plates are attached to the flat portion on the upper side of each coil.

The coreless motor relating to this invention may be so composed that thin, round, annulus-shaped lower-side reinforcing plates are attached to further below the flat portion of the coil which is fitted to the lower face of the said coil folder flange.

The coreless motor relating to this invention may further be so composed that the aforementioned lower-side reinforcing plates are installed in parallel with the flange by means of a spacer, whose length is almost equal to the thickness of the flat portion on the lower side of the coil, while the flat portion on the lower side of the coil is inserted to, and fixed in, the gap formed by the spacer between the flange and the lower-side reinforcing plates.

The coreless motor relating to this invention may be composed so that the said upper-side reinforcing plate is made of conductive materials, that one end of each coil is linked to the said upper-side reinforcing plate, that the other end of each coil is connected to the commutator formed around the rotating axis, which is set below the coil holder.

The coreless motor relating to this invention may be equipped with a ring-shaped coil yoke fitted to the interior of a casing, which has a conductive coil connected to a ring-shaped magnet, whose external circumference face stands opposed to the internal circumference face of the coil yoke, with the coil designed to revolve jointly with the rotating axis following power input to the said coil; wherein the said coil confronts the upper and lower faces of the magnet and consists of a flat portion whose plane part takes an arc form and of a curved-and-folded portion composed of a winding unit confronting the external circumference side face of the magnet, while the section from one end of the lead wire composing these winding units to its other end constitutes a continuous hollow unit; wherein the said magnet may comprise four poles arranged in the radial direction where three of said coils are installed around the rotating axis; and wherein a six-segment commutator may be fixed around the rotating axis, with two brushes set in positions each forming an angle of 90° in relation to the commutator.

The coreless motor relating to this invention may be one which is equipped with a ring-shaped coil yoke fitted to the interior of a casing; which as a conductive coil connected to a ring-shaped magnet, whose external circumference face stands opposed to the internal circumference face of the coil yoke, with the coil designed to revolve jointly with the rotating axis following power input to the said coil; wherein the aid coil confronts the upper and lower faces of the magnet and consists of a at portion whose plane part takes an arc form and of a curved-and-folded portion composed of a winding unit confronting the external circumference side face of the magnet, while the section from one end of the lead wire composing these winding units to its other end constitutes a continuous hollow unit; wherein the said magnet comprises two poles arranged in the circumferential direction and three of said coils are installed around the rotating axis; and wherein three-segment commutator is fixed around the rotating axis, with two brushes set in positions parallel with each other in relation to the commutator.

The coreless motor relating to this invention may further be so composed that the aforementioned magnet is fixed to the external circumference of the ring-shaped magnet holder which is equipped with a cylinder unit, designed to hold a bearing in its upper part with this cylinder unit inserted into, and fitted to, a boss formed in the center of the top panel of the casing, while the said rotating axis is held by a bearing installed within the said cylinder unit.

The coreless motor relating to this invention may further be such that its magnet holder mentioned above has a dented portion on its lower side, with the upper portion of the coil holder composed so as to touch this dented portion of the magnet holder.

The coreless motor relating to this invention still further may be one in which the interior surface of the said coil yoke is shaped to correspond with the external circumference side face and upper and lower faces of the coil, and the coil yoke is formed by bonding together the upper half portion of the coil yoke that contains the upper half of the coil and its lower half portion that contains the lower half of the coil.

The coreless motor relating to this invention moreover may be one wherein the said magnet is composed by arranging 4 arc-shaped magnets, individually magnetized in the radial direction, in ring form.

BRIEF DESCRIPTION OF THE DRAWINGS

Further feature of the present invention will become apparent to those skilled in the art to which the present invention relates from reading the following specification with reference to the accompanying drawings, in which:

FIG. 7 is a composition diagram showing the relationship between the commutators and brushes in the $2^{nd}$ embodiment;

FIG. 8 is a time chart for electric conduction to the coil in the $2^{nd}$ embodiment.

DETAILED DESCRIPTION OF THE PRESENT INVENTION

Figure 1:
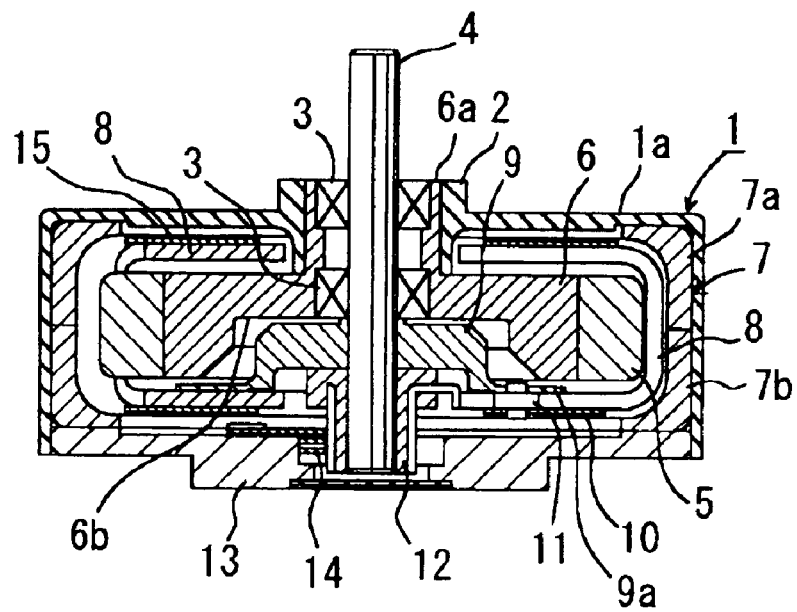
FIG. 1 is a vertical cross-section diagram showing an embodiment of the motor relating to this invention.

Hereunder, an embodiment of the coreless motor relating to this convention is explained based on a specific example shown in the attached figure.

A casing 1 is formed in a cylindrical form whose lower end is opened, while at the center 1a of the top panel of the casing there is a cylinder-shaped boss 2, whose upper and lower ends can be opened, and into the said boss, a cylindrical unit 6a of a magnet holder 6—which has a ring-shaped magnet 5, concentric with the rotating axis, on its external circumference—is inserted, while 2 (upper and lower) row bearings 3, 3 are contained in the vertical center hole in the said magnet holder, with the central axis 4 being supported, in a revolution possible manner, by these bearings.

Each aforesaid magnet 5 is, for instance, 4-poler magnetized in the radius direction, while the upper and lower faces and external circumference side face of magnet 5 are opposed to the internal circumference face of coil yoke 7, formed on the internal circumference face of the said casing 1, with a suitable gap in between, in this gap power conductive coils 8, 8 are installed in a manner not to contact the magnet and the coil yoke.

Figure 2:
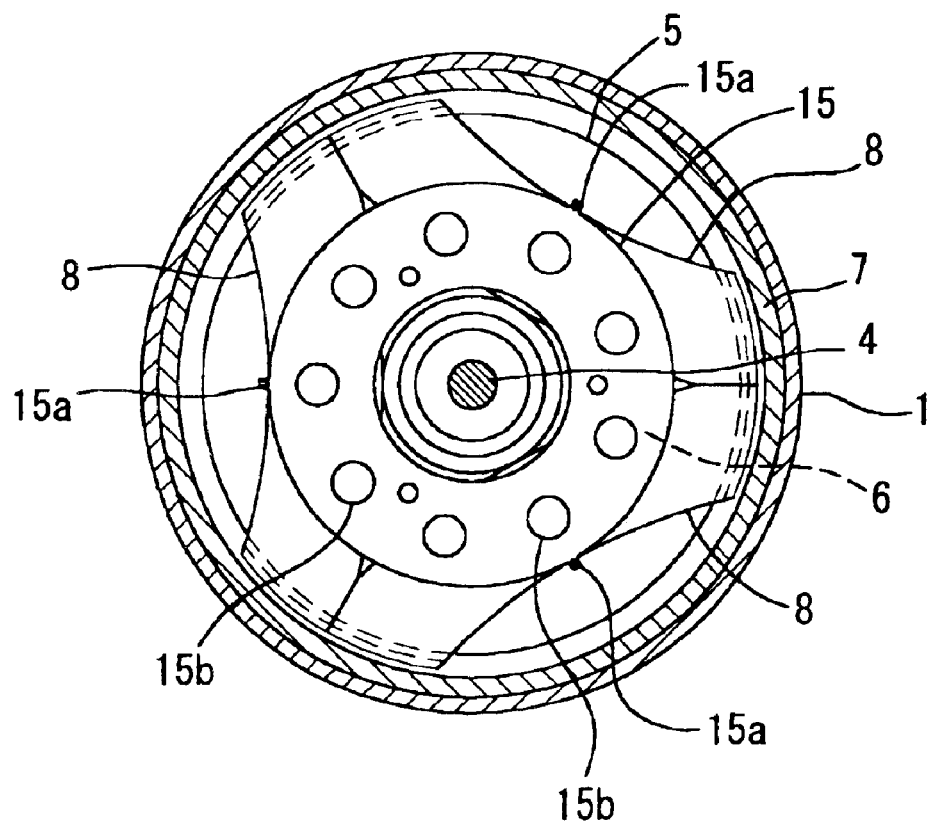
FIG. 2 is a lateral cross-section diagram showing an embodiment of the motor relating to this invention.
Figure 3:
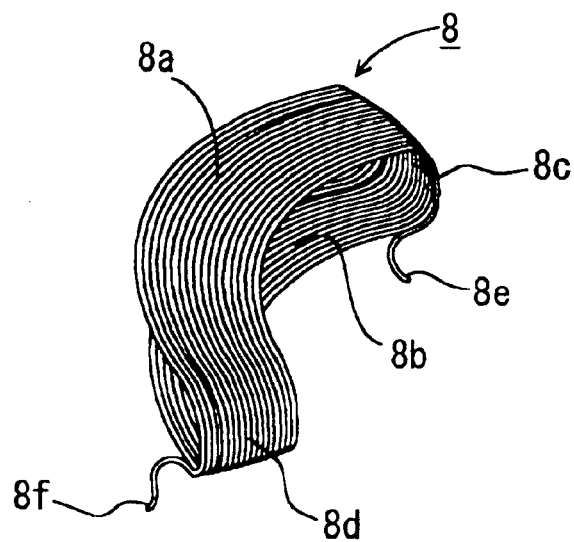
FIG. 3 is an oblique view diagram of the coil.

Each aforesaid coil 8 has, as shown in FIG. 3, upper and lower flat portions 8a, 8b, which confront the upper and lower faces of the said magnet 5, and curved-and-folded portions 8c, 8d confront the external circumference side faces of the magnet, while the aforesaid flat portions 8a, 8b are so composed that each of their plane parts takes the form of an arc, with one end 8e of the lead wire to the other end 8f being formed in a continuous hollow coil; thus, multiple coils (3 units in the case of FIG. 2) are arranged side by side in the external circumference direction of the said magnet, in such a manner their winding units of their flat potions are opposed to the upper and lower faces of the magnet, while the winding units of the curved-and-folded portions are opposed to the external circumference side face of the magnet.

Meanwhile, the internal face of each aforementioned coil takes the form in line with the upper and lower faces and external circumference side face of magnet 5, so that the distance between the mutually confronting portions of the coil and magnet is constant.

Furthermore, the aforesaid coils 8, 8 are supported, with their lower flat portion 8b sandwiched by the lower face of a flange 9a, which is formed on the lower part of the coil holder 9, which is in an almost round plate form and fixed to the periphery of the aforesaid rotating axis 4, and lower-side reinforcing plate 10; to be more precise, lower-side reinforcing plate 10 is attached to flange 9a through the mediation of spacer 11, and based on this arrangement, lower-side flat portion 8b of the coil is inserted into the gap between the lower-side reinforcing plate and the flange, and it is fixed in that state by means of additive and the like.

The said spacer 11 is so arranged that position alignment can be attained by contacting the periphery part of the coil when attaching coils 8, 8 to the coil holder, such that a merit of improved operability can be expected during the manufacturing of a motor.

The upper portion of the said coil holder 9 is so composed that it will engage with the interior of a dented portion 6b formed on the lower side of the said magnet holder 6; it is designed that, based on this arrangement, the height (thickness) of the motor in the axis direction can be reduced.

Furthermore, an annulus ring-shaped upper-side reinforcing plate 15 is adhered to the upper face of flat portion 8a on the top of the coil. This upper-side reinforcing plate is made of a conductive metal sheet, while wire connection protrusions 15a are formed at 3 points of the external circumference, as shown in FIG. 2, so that it will be possible to effect electric connection between coils by linking an end of each coil to the said protrusion.

Said wire connection-use protrusion has a dented portion designed to sandwich a coil lead wire, so that it is possible to put the lead wire in the dented portion and solder the wire easily.

In addition, around the rotating axis in the lower central part of the said coil holder 9, a commutator 12 is installed, and of two ends of the lead wire that constitutes the aforementioned coil, the one not connected to the said upper-side reinforcing plate can be linked to this commutator, so that contact can be made with brush 14 from a lid plate 13, which also serves as a brush stand, blocking up the lower part of an opening for the casing 1.

Figure 4:
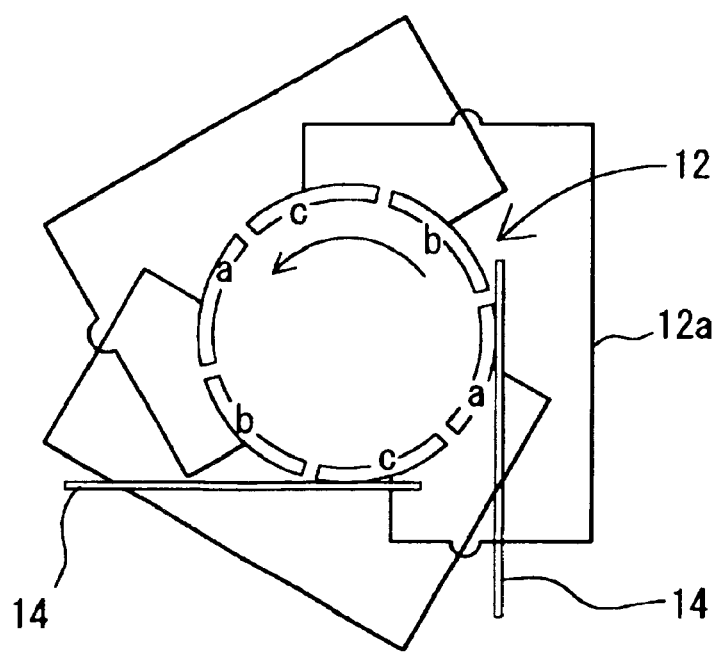
FIG. 4 is a composition diagram illustrating the relationship between the commutators and brushes in the $1^{st}$ embodiment.

The aforementioned commutator 12 is made of 6 segments, as shown in FIG. 4, with two confronting terminals connected to one end of the same coil, while the said brushes 14 are installed at positions individually forming an angle of 90° in relation to this commutator terminal, such that 2 brushes are designed to be individually connected to 2 terminals each of 6 commutator terminals. Accordingly, the conductive time chart for the 3 coils will be as indicated in FIG. 5.

Figure 5:
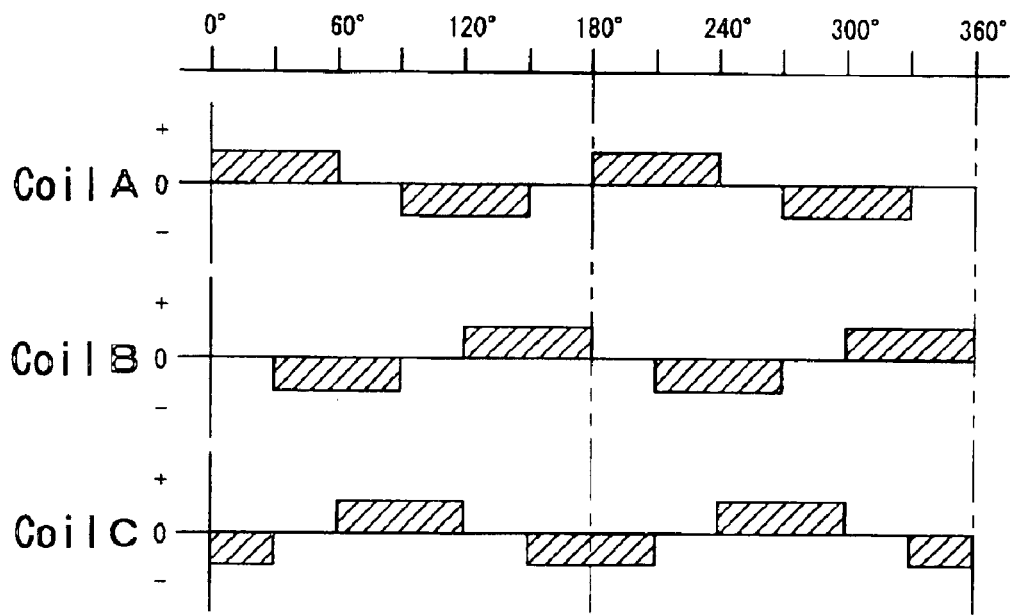
FIG. 5 is a time chart for electric conduction to the coil in the $1^{st}$ embodiment.

In FIGS. 4 and 5, symbols A, B and C are allotted to the 3 coils for differentiation purposes, and symbols a, b and c are attached to the terminals linked with the individual coils, to show corresponding relationship between the terminals and coils. Further, symbol 12a in FIG. 4 represents a conductive circuit designed to connect terminals installed in opposite positions. Although the circuit is shown with a thick line, in fact it is composed of metal sheets or coated lead wires laid on the wire connection panels for the commutator.

Figure 6:
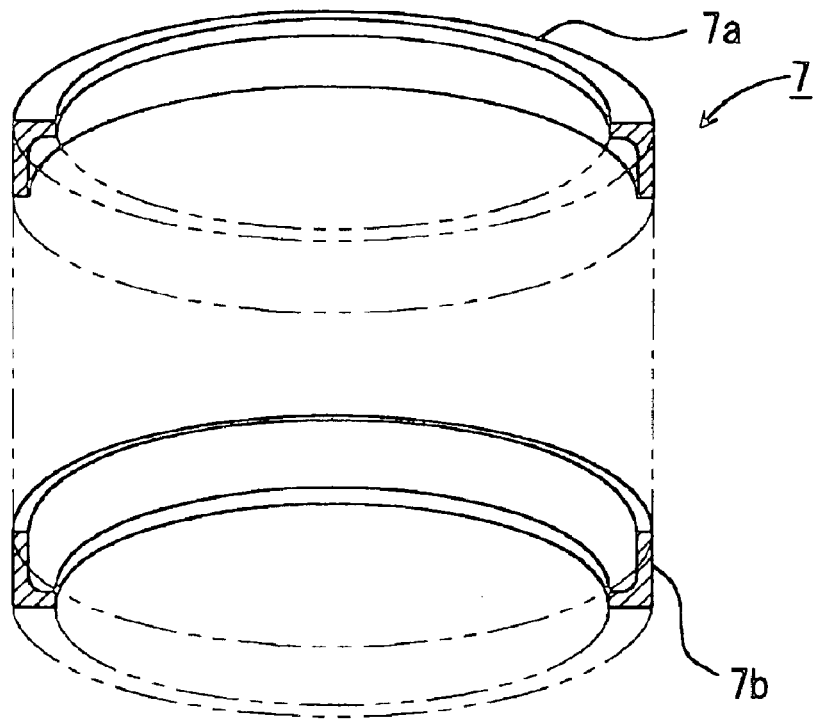
FIG. 6 is an oblique disassembly view diagram.

While the plane part of the said coil yoke is of a ring shape, and its internal structure is so arranged that the external circumference side face and upper and lower faces of magnet 5 are enclosed from outside in the radius direction, with the internal face thus forming a concave shape following the patterns of the exterior circumference side face and upper and lower faces of the magnet; as shown in FIG. 6, the coil yoke is composed of upper half portion 7a and lower half portion 7b.

Said coil yoke consists of upper half portion 7a and lower half portion 7b, which are fabricated through press shaping of magnetic materials, such as iron, for instance. Upper half portion 7a may be made of the same material with that of casing 1 and unified with it into a single unit.

In a motor composed as stated above, a rotational driving force arises around the axis of the coil upon power input to coils 8, 8 from brush 14 and commutator 12, causing the revolution of coils 8 & 8, coil holder and revolving axis 4, which is the output spindle.

In the said motor of this invention, lead wires composing the coil form an almost right angle with the revolving direction of the coil, and in addition, coil 8 surrounds not only the external circumference face of magnet 5 but also its upper and lower faces as well, while coil yoke 7 cover not only the external circumference face but also the upper and lower faces of the coil, so that most of magnet flux radiated from the magnet is led to the coil yoke; as such, consumption of driving electric power to the rotational driving torque of rotating axis 4, which is the motor output, can be small, such that excellent motor capable of driving at a low electric power and characterized by high energy efficiency can be obtained.

Next, the process for assembling the motor in the aforementioned embodiment is explained.

First, fix lower-side reinforcing plate 10 to flange 9a of coil holder 9 through the mediation of spacer 11, and rotating axis 4 is forcibly pushed into the central vertical hole of coil holder 9 and fixed in that state, while commutator 12 is fitted to rotating axis 4.

Then, around rotating axis 4, which is further above coil holder 9, lower-side bearing 3, magnet holder 6 and upper-side bearing 3 are fitted in this order and fixed there. Around magnet holder 6, magnet 5 is attached in advance.

Subsequently, lower-side flat portion 8b of coils 8, 8 is inserted between the aforementioned flange 9a and lower-side reinforcing plate 10 and fixed there with adhesive, and upper-side reinforcing plate 15 is attached and fixed to upper-side flat portion 8a of the coil, while one end of the lead wire constituting each coil is linked to the upper-side reinforcing plate, with the other end connected to a terminal of the commutator.

Next, upper half portion 7a of coil yoke 7 is attached to the interior of casing 1, while cylinder unit 6a of magnet holder 6 is inserted into and fitted to cylindrical boss 2; this should be followed by attaching lower-half portion 7b of the coil yoke and covering the lower opening part of the casing by means of lid plate 13, which also serves as a brush stand, for the final completion of the motor.

In the case of the motor in the first embodiment, magnet 5 is designed as the 4-polar-magnetized one, but the magnet can also be such one as 2-polar magnetization arranged in the diameter direction. In the latter instance, output properties, such as torque constant, are slightly inferior to those of the 4-polar-magnetized magnet, but compared with other motors of the same size, its output properties are better, with an added merit of lower parts cost for the magnet.

As to the 2-polar-magnetized magnet mentioned above, 3-segment products such as those shown in FIG. 7 are adopted as commutator 16. In this arrangement, two brushes 17, 17 are laid so as to be in parallel with each other. Its electric conductive time chart is shown in FIG. 8.

When properties of the coreless motor of this invention characterized by 4-pole-magnetization (embodiment 1) and the coreless motor with 2-pole-magnetization (embodiment 2), as composed as stated above, are examined, the results shown in Table 1 below are obtained.

In Table 1, the mark φ in the column of size indicates the diameter of the casing, while L in the same column shows the height of the casing.

TABLE 1

|  | The 1$^{st}$ embodiment | The 2$^{nd}$ embodiment |
| --- | --- | --- |
| Sizeφ-L (mm) | φ41-17 | φ41-17 |
| Volume (mm$^3$) | 22433 | 22433 |
| Rated voltage (V) | 12 | 12 |
| Startup current (mA) | 1065 | 960 |
| Non-load number of revolutions (rpm) | 2300 | 3270 |
| Non-load current (mA) | 4 | 4.8 |
| Startup torque (mNm) | 53.2 | 33.2 |
| Torque constant (mNm/A) | 50.1 | 34.8 |
| Maximum output (W) | 3.17 | 2.85 |
| Maximum efficiency (%) | 88 | 86.3 |
| Mechanical time constant (ms) | 12 | 28 |

As shown in Table 1 shown above, both the 1$^{st}$ embodiment and the 2$^{nd}$ embodiment of this invention are excellent in the startup torque, torque constant and, particularly, maximum efficiency.

Figure 9:
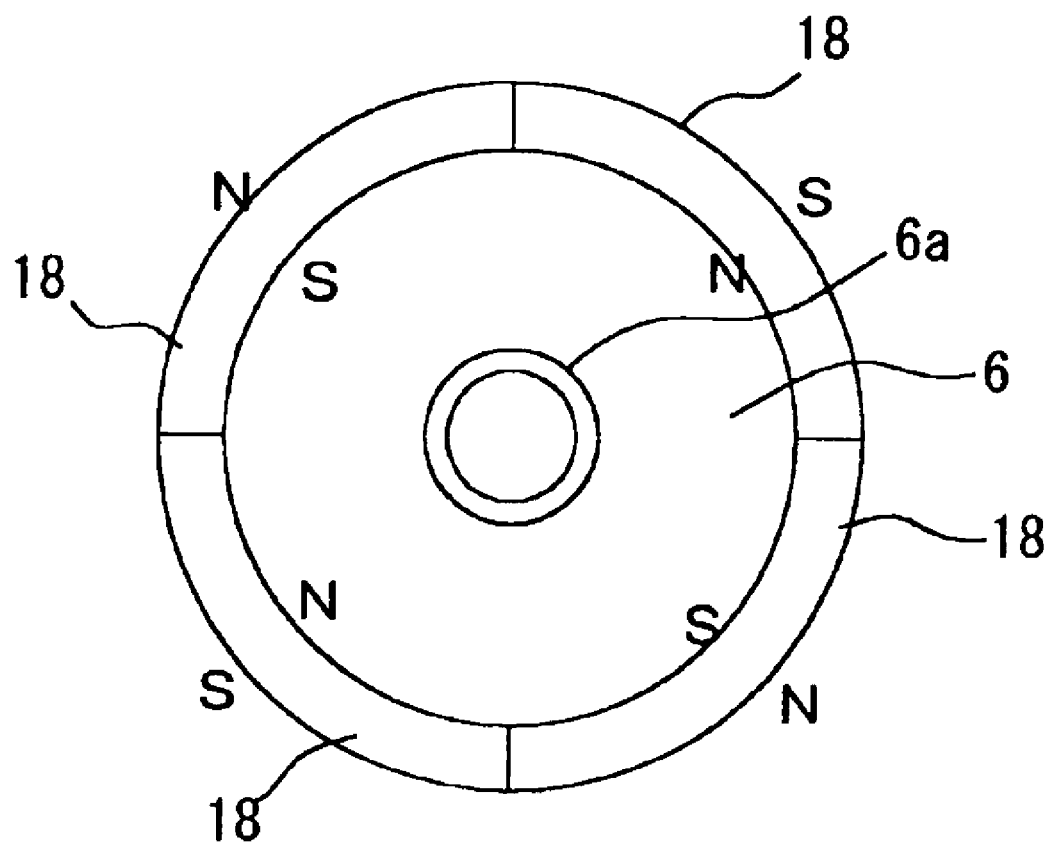
FIG. 9 is a plan for the magnet when the magnet is composed of 4 arc-formed magnets.

In the 1$^{st}$ embodiment mentioned above, ring-shaped magnet 5, which is 4-pole-magnetized in the radius direction, is used. As shown in FIG. 9, however, there may be a case in which 4 arc-shaped magnets 18, 18 are arranged in the circumference direction to eventually compose one ring-shaped magnet.

Each aforementioned arc-shaped magnet 18 is magnetized in the radius direction. Based on this arrangement, it is possible to curtail the manufacturing cost in fabricating an aerotropic magnet featuring strong magnetic force in comparison with producing a ring-shaped radial aerotropic magnet. Accordingly, there is such a big merit as being capable of reducing the magnet parts cost in the motor parts cost.

The reason why a coreless motor is said to be high priced is that, for its magnet, a product having strong magnetic power and therefore being expensive must be used. Accordingly, the merit in the capability of reducing the parts cost of the magnet is considerably important in attaining cost reduction of coreless motors.

As in the case of the embodiments shown above, this invention relates to a coreless motor, which is equipped with brushes for power conduction to the coil. The method of controlling the motor in the $1^{st}$ embodiment, shown above, can be suitably applied to the brushless motor of the magnet revolution type. Namely, in the case of a brushless motor equipped with 3 coils and a 4-polar radial magnetization arranged magnet, the aforementioned purpose can be attained by effecting the same electric conduction control as shown in the conductive time chart indicated in FIG. 5 by using an electronic circuit, instead of the commutator and brushes in the $1^{st}$ embodiment. To be specific, it should be arranged that the revolution location of the magnet will be detected through 3 hole sensors installed with a distance of 60° or 120° on the revolving orbit of the magnet and that conductive control will be carried out in accordance with signals from these hole sensors.

ADVANTAGE OF THE PRESENT INVENTION

Regarding the motor relating to this invention, coils are installed so as to surround the external circumference side face and upper/lower faces of the magnet, such that most of magnetic flux from the magnet is guided to the coils, and that consumption of driving electric power to the rotation driving torque for the rotating axis, which is the output of the motor, can be small. As such, it is possible to obtain a motor capable of driving at a low electric power and featuring highly good energy efficiency.

Furthermore, the said coil is composed of a winding portion whose flat part forms an arc shape and a winding portion confronting the external circumference side face of the magnet, with the section from one end of the lead wire that composes such a coil to the other end constituting a continuous hollow unit. Accordingly, most portions of the lead wire that comprises the coil form a right angle with the circumference direction of the magnet, namely the revolving direction of the coil. This allows effective utilization of magnetic flux from the magnet, which also helps obtain a motor featuring high energy efficiency.

Moreover, the upper flat portion of the coil is held and fixed at its central part by the upper-side reinforcing plate, while the lower flat portion of the coil is held and fixed at its central part by the coil holder flange and the lower-side reinforcing plate. Because this arrangement, sufficient intensity can be obtained even if a centrifugal power is applied due to the revolution of the coil, with little fear of coil deformation needed during the revolution. Thus, it is possible to enhance the reliability of the motor.

In addition, the said coil yoke is so designed that its internal face follows the pattern of the external circumference side face and upper/lower faces of the coil, such that the magnetic flux from the magnet is effectively led to the coil yoke, that magnetic resistance is small, that rotational unevenness rarely occurs and that, therefore, significantly smooth and stabilized revolving output can be obtained.

In a case where the magnet is so composed as forming an arc-shape, furthermore, it is possible to obtain a magnet with strong magnetic force at low prices, such that cost reduction of the motor can be expected from this design.

While particular embodiments of the present invention have been illustrated and described, it should be obvious to those skilled in the art that various changes and modifications can be made without departing from the spirit and scope of the invention.

What is claimed is:

1. A coreless motor comprising:
   a ring-shaped coil yoke fitted to the interior of a casing, which has a conductive coil connected to a ring-shaped magnet, hose external circumference face opposes the internal circumference face of the coil yoke, and the coil designed to revolve jointly with the rotating axis following power input to the said coil;
   wherein the said coil confronts the upper and lower faces of the magnet and consists of a flat portion whose plane part takes an arc form and of a curved-and-folded portion composed of a winding unit confronting the external circumference side face of the magnet, while the section from one end of the lead wire composing these winding units to its other end constitutes a continuous hollow unit;
   wherein a thin-sheet-shaped flange is installed on the lower part of the coil holder fixed to the periphery of the said rotating axis and a plurality of said coils are attached so as to be arranged in line with the circumference direction of the magnet by fixing the flat portion on the lower side of each coil to the flange; and
   wherein thin annulus-shaped upper-side reinforcing plates are attached to the flat portion on the upper side of each coil.

2. The coreless motor stated in claim 1, which is constituted by attaching a thin ring-shaped lower-side reinforcing plate to the further below part of the flat portion of the coil, which is fixed to the lower face of the said coil holder flange.

3. The coreless rotor stated in claim 2, whose lower-side reinforcing plate mentioned above is installed in a space up to the coil holder flange so as to be in parallel with the flange by means of a spacer, whose length is almost equal to the thickness of the lower-side flat portion of the coil, while the flat lower-side portion of the oil is put into, and fixed to, the gap formed by the spacer between the flange and the lower-side reinforcing plate.

4. The coreless motor stated in claim 1, wherein the upper-side reinforcing plate consists of conductive materials, with one end of each coil linked to the upper-side reinforcing plate, and the other end of the coil connected to the commutators installed around the rotating axis in the lower portion of the coil holder.

5. A coreless motor comprising:
   a ring-shaped coil yoke fitted to the interior of a casing, which has a conductive coil connected to a ring-shaped magnet, whose external circumference face stands opposed to the internal circumference ace of the coil yoke, and the coil designed to revolve jointly with the rotating axis following power input to the said coil;
   wherein the said coil confronts the upper and lower faces of the magnet and consists of a flat portion whose plane part takes an arc form and of a curved-and-folded portion composed of a winding unit confronting the external circumference side face of the magnet, while the section from one end of the lead wire composing these winding units to its other end constitutes a continuous hollow unit;

wherein the said magnet comprises four poles arranged in the radial direction and three of said coils are installed around the rotating axis; and wherein a six-segment commutator is fixed around the rotating axis, with two brushes set in positions each forming an angle of 90° in relation to the commutator.

6. A coreless motor comprising:

a ring-shaped coil yoke fitted to the interior of a casing, which has a conductive coil connected to a ring-shaped magnet, whose external circumference face stands opposed to the internal circumference face of the coil yoke, and the coil designed to revolve jointly with the rotating is following power input to the said coil;

wherein the said coil confronts the upper and lower faces of the magnet and consists of a flat portion whose plane part takes an arc form and of a curved-and-folded portion composed of a winding unit confronting the external circumference side face of the magnet, while the section from one end of the lead wire composing these winding units to its other end constitutes a continuous hollow unit;

wherein the said magnet comprises two poles arranged in the circumferential direction and three of said coils are installed around the rotating axis; and wherein three-segment commutator is fixed around the rotating axis, with two brushes set in positions parallel with each other in relation to the commutator.

7. A coreless motor as recited in claim 1, wherein the aforementioned magnet is fixed to the external circumference of the ring-shaped magnet holder which is equipped with a cylinder unit, designed to hold a bearing in its upper part with this cylinder unit engaged with, and fitted to, a boss formed in the center of the top panel of the casing, while the said rotating axis is held by a bearing installed within the said cylinder unit.

8. The coreless motor stated in claim 7, whose magnet holder mentioned above has a dented portion on its lower side, with the upper portion of the coil holder composed so as to touch this dented portion of the magnet holder.

9. A coreless motor as recited in claim 1, wherein the internal surface of the coil yoke is shaped to correspond with the external circumference side face and upper and lower faces of the said coil, and the coil yoke is formed by bonding together the upper half portion of the coil yoke that contains the upper half of the coil and its lower half portion that contains the lower half of the coil.

10. A coreless motor as recited in claim 1. wherein the said magnet is composed by arranging 4 arc-shaped magnets, individually magnetized in the radial direction, in a ring form.

11. A coreless motor as recited in claim 5, wherein the said magnet is fixed to the external circumference of the ring-shaped magnet holder, which is equipped with a cylinder unit designed to hold a bearing in its upper part, said cylinder unit engaged with, and fitted to, a boss formed in the center of the top panel of the casing, while the said rotating axis is held by a bearing installed within the said cylinder unit.

12. A coreless motor as recited in claim 6, wherein the said magnet is fixed to the external circumference of the ring-shaped magnet holder, which is equipped with a cylinder unit designed to hold a bearing in its upper part, said cylinder unit engaged with, and fitted to, a boss formed in the center of the top panel of the casing, while the said rotating axis is held by a bearing installed within the said cylinder unit.

13. A careless motor as recited in claim 5, wherein the internal surface of the coil yoke is shaped to correspond with the external circumference side face and upper and lower faces of the said coil, and the coil yoke is formed by bonding to ether the upper half portion of the coil yoke that contains the upper half of the coil and its lower half portion that contains the lower half of the coil.

14. A coreless motor as recited in claim 6, wherein the internal surface of the coil yoke is shaped to correspond with the external circumference side face and upper and lower faces of the said coil, and the coil yoke is formed by bonding to together the upper half portion of the coil yoke that contains the upper half of the coli and its lower half portion that contains the lower half of the coil.

15. A coreless motor as recited in claim 5, wherein the said magnet is composed by arranging 4 arc-shaped magnets, individually magnetized in the radial direction, in a ring form.

16. A coreless motor as recited in claim 6, wherein the said magnet is composed by arranging 4 arc-shaped magnets, individually magnetized in the radial direction, in a ring form.

* * * * *